United States Patent [19]

Conner

[11] 3,930,887
[45] Jan. 6, 1976

[54] BATTERIES WITH IMPROVED SHELF LIFE
[75] Inventor: Willard P. Conner, Chadds Ford, Pa.
[73] Assignee: Hercules Incorporated, Wilmington, Del.
[22] Filed: Feb. 20, 1974
[21] Appl. No.: 445,007

[52] U.S. Cl. .............................. 136/107; 136/135 R
[51] Int. Cl.² ........................................ H01M 23/00
[58] Field of Search .... 136/181, 182, 134 P, 134 R, 136/107, 102, 83 R, 3, 135 R; 324/53

[56] References Cited
UNITED STATES PATENTS

| | | | |
|---|---|---|---|
| 2,159,034 | 5/1939 | Matthews | 136/83 R |
| 2,653,180 | 9/1953 | Hignett et al. | 136/181 R X |
| 2,876,271 | 3/1959 | Cahoon | 136/135 P |
| 3,007,110 | 10/1961 | Rosenstrach | 136/182 X |

*Primary Examiner*—Anthony Skapars
*Attorney, Agent, or Firm*—Stanley A. Becker; Edwin H. Dafter, Jr.

[57] ABSTRACT

This invention relates to batteries with improved shelf life. When a relatively high resistance element is connected across the terminals of a battery, the resulting low current drain inhibits the self discharge of the battery and thus improves the shelf life. The resistance element can be built into the battery or mounted externally. The invention also relates to a battery-operated article, such as a flashlight, having a high resistance load built into the article to contact the terminals of the battery to provide a low current drain when the article is not being used.

18 Claims, 3 Drawing Figures

BATTERIES WITH IMPROVED SHELF LIFE

BACKGROUND OF THE INVENTION

This invention relates to improved batteries, and particularly to the improvement of the shelf life of dry cell and other batteries which self-discharge when stored in high temperature environments.

The Daniell cell one of the early practical sources of energy, was found to work best when operating continuously in a closed circuit. The Daniell cell includes a zinc electrode immersed in a solution of zinc ions and a copper electrode immersed in a solution of bivalent copper ions. The two solutions are separated usually with porous plate separators or by gravity. Under open circuit conditions copper ions migrate to and deposit on the zinc electrode. This in effect results in the formation of small short circuited cells which rapidly dissolve the zinc electrode. A low resistance connection between the electrodes has been used to maintain cells under short-circuited conditions to inhibit this copper ion attack of the zinc electrode which results in improved operation of the cell.

In general, when a battery is stored or is not being used, it tends to self-discharge which results in decreased capacity of the battery. In a Leclanché-type dry cell, it is thought that this may be due to polarization, deposition of insoluble salts at an interface close to the anode as a result of localized pH changes or high concentrations of zinc ion, or formation of hydrogen peroxide from dissolved oxygen which reacts with the manganese dioxide. At elevated temperatures, usually above 25°C., the loss of capacity is increased. The higher the temperature, the more rapidly the battery loses its capacity. The self-discharge of the battery can be represented by the current which would have to be drawn externally to effect the same reduction in the capacity of the battery. Typical self-discharge characteristics at 50°C. of size "D" dry cells are shown in Table I.

Table I

| Average Effective Self-Discharge Current (SDC) of "D" Type Dry Cells at 50°C. over Specified Periods | |
|---|---|
| Period (days) | Average SDC (milliamps) |
| 0–10 | 0.31 |
| 10–30 | 0.25 |
| 30–60 | 0.13 |
| 69–90 | 0.04 |

SUMMARY OF THE INVENTION

In accordance with this invention, it has been found that if a high resistance element is connected across the terminals of a battery, the shelf life is significantly improved. The resistive load produces an external low current drain on the battery. For reasons not fully understood, this low current drain improves the shelf life of the battery.

DESCRIPTION OF THE INVENTION

Figure 1:
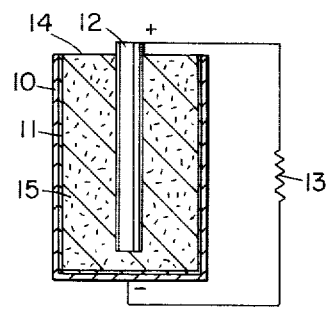
FIG. 1 is a cross-sectional view of a dry cell battery having a resistance element mounted externally of the battery and connected across the terminals in accordance with the principles of this invention.

Referring to FIG. 1, there is shown a conventional Leclanché-type dry cell battery. The battery includes a zinc anode 10 in the form of a container lined with a separator 11 and filled with a depolarizer-electrolyte mix 15, which usually is a paste of manganese dioxide, a solution of zinc and ammonium chlorides and a stiffening agent. The separator 11 prevents shorting of the zinc anode and the manganese dioxide, which is the active cathodic component of the depolarizer-electrolyte mix 15. A carbon cathode 12 is positioned in the mix 15 and projects from the insulating cover 14 which seals the container. The projecting end of the cathode 12 serves as the positive terminal of the battery and the bottom of the anode usually serves as the negative terminal, as for most uses the sides of the anode are coated with an insulating material. A high resistance element 13 is mounted outside the container and connects the cathode 12 with the anode 10.

The resistive value of the element 13 should permit a sufficient current drain on the cell. If the resistance is too high, the current drain may not be sufficient to improve the depolarization of the cell and thus improve the self-discharge rate. On the other hand, if the resistance is too low, too high a current may be drained from the cell and the capacity of the cell may be further reduced. The optimum current drain for improving the shelf life of the batteries is about 20 percent of the self-discharging current. For a size "D" dry cell battery at 50°C. a resistance load of about 10,000–40,000 ohms is desirable.

As stated above, the self-discharge rate of dry cell batteries is temperature-dependent. At higher temperatures the self-discharge rate is increased and a larger current drain is necessary to improve the capacity after storage. Since the current drawn from a battery is inversely proportional to the resistance load, at elevated temperatures a lower resistance load is required to improve the shelf life. Under actual storage conditions batteries may be exposed to varying temperatures. For this reason, it is particularly preferred to use a resistance element having a high negative temperature coefficient of resistance, i.e., the resistance of the element decreases as the temperature increases. Thus a larger current will automatically be drawn from the battery at higher temperatures and the self-discharge rate of the battery will be improved. Typical of such resistance elements are thermistors prepared from sintered metal oxides. The resistance values of the thermistors can range from 100,000–150,000 ohms at 23°C., 25,000–50,000 ohms at 50°C. and 10,000–20,000 ohms at 75°C.

Figure 3:
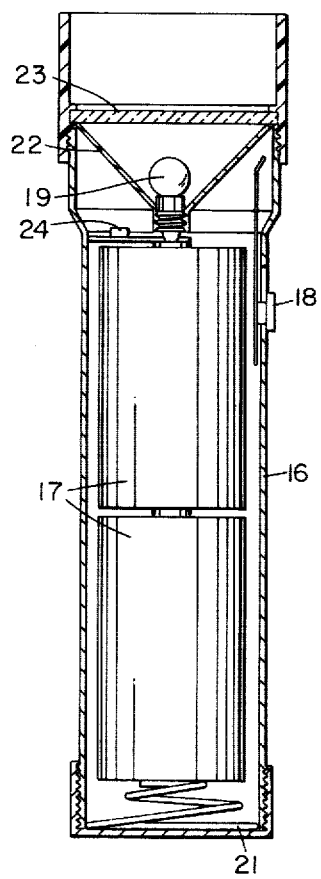
FIG. 3 is a cross-sectional view of a flashlight containing a resistance element positioned to connect across the terminals of the batteries inserted into the flashlight to provide low current drain on the batteries.

The resistance element can be externally connected to the battery terminal as illustrated in FIG. 1. The external resistance can be made a part of the device in which the battery is to be used, such as in a flashlight, portable radio, battery-operated toy, and the like. FIG. 3 illustrates a typical flashlight containing a high resistance element 24 positioned to draw a continuous low current drain on the batteries. The flashlight includes a metal casing 16, two dry cell batteries 17, an on-off switch 18 which operates to close the circuit and permit a flow of current to a bulb 19. A spring 21 forces the batteries 17 into contact with the bulb 19. A reflector 22 surrounds the bulb 19 to concentrate and direct the light from the bulb. A lens 23 further directs the light produced by the bulb. The high resistance element 24 is connected across the terminals of the batteries 17 by grounding the positive terminal of the batteries to the case, which in turn is connected to the negative terminal by the spring 21. Since the high resistance element is in parallel with the lower resistance bulb circuit, when the switch 18 is closed most of the current from the batteries will flow through the bulb circuit and provide the desired light.

The flashlight can be modified to incorporate a high resistance element which would be connected across the terminals of the batteries to provide a low current drain only when the switch is open. With such a modification, when the switch is closed all current from the batteries would be used to operate the bulb. One such modification could be the use of a single pole double throw switch. This three terminal switch would alternatively connect the batteries with either the bulb circuit to light the flashlight for use or with the high resistance element when not in use, thus increasing the shelf life of the batteries.

Figure 2:
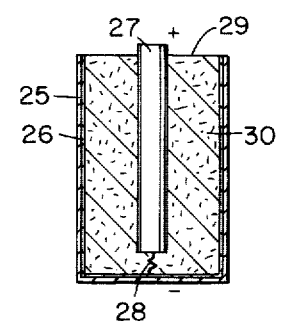
FIG. 2 is a cross-sectional view of an alternative dry cell battery having a resistance element mounted within the battery connecting the anode and the cathode.

The high resistance element can be made a part of the internal battery construction as illustrated in FIG. 2. FIG. 2 shows a dry cell battery which includes a zinc anode 25 in the form of a container lined with a separator 26 and filled with a depolarizer-electrolyte mix 30. A carbon cathode 27 is positioned in the mix 30 and projects from the insulating cover 29 which seals the container. A high resistance element 28 is mounted within the container and connects the anode 25 with the cathode 27. For example, this can be accomplished by placing a ceramic sintered metal oxide thermistor inside the battery making contact with the anode and cathode. Such a ceramic sintered metal oxide thermistor has a high negative temperature coefficient of resistance and can be selected to provide automatically the desired current drain at different temperatures.

A high resistance element can be similarly incorporated into other battery-operated articles, such as radios, battery-operated toys, razors, motors, and the like. Additionally, a high resistance element can be incorporated into a package or display case used to transport and store the battery before use by the ultimate consumer. The resistance can be positioned in the package to contact the terminals of each battery in the package and thus provide a continuous low current drain on the battery to improve the shelf life.

The following examples illustrate the improvement in the shelf life of 1.5 volt Leclanché-type dry cell batteries when stored under a high resistance load. In these examples the cell capacity is measured by discharging a dry cell battery through a 3-ohm resistance load to determine the total milliamp hours (ma.-hr.) delivered to the load to a terminal voltage of 1 volt. In each example the results are referenced to a control set of batteries held at 23°C. without a resistance load.

EXAMPLE 1

A series of 11 dry cell batteries type "D" (Ray-O-Vac 3D) were stored for 70 days under various loaded and unloaded conditions. The initial and final cell capacities were determined as described above. The following table illustrates the effect of providing an external shunting resistor on the battery.

| Condition | Cell Capacity (11 Battery Average) |
|---|---|
| Reference batteries | 1237 ma.-hr. |
| Batteries under no load after 70 days aging (50°C.) | 936 ma.-hr. |
| Batteries under 10,000 ohm load after 70 days aging (50°C.) | 1067 ma.-hr. |
| Batteries under 43,000 ohm load after 70 days aging (50°C.) | 890 ma.-hr. |

The results show that the 10,000 ohm load provided sufficient current drain to improve the shelf life of the batteries at 50°C whereas the 43,000 ohm load provided an insufficient external drain.

EXAMPLE 2

A series of six dry cell batteries type "D" (Ray-O-Vac 3D) were stored at 75°C. for 20 days under loaded and unloaded conditions. The initial and final capacities were determined as described above. The following illustrates the results.

| Condition | Cell Capacity (six battery average) |
|---|---|
| Reference batteries | 1237 ma.-hr. |
| Batteries under no load after 20 days heat aging (75°C.) | Less than 200 ma.-hr. |
| Batteries under 10,000 ohm load after 20 days heat aging (75°C.) | 946 ma.-hr. |

Four of the batteries stored at 75°C. without load had no usable capacity. All of the batteries stored under a 10,000 ohm load retained 77 percent of their initial capacity.

EXAMPLE 3

A series of 11 low capacity batteries type "D" (Union Carbide Industrial Battery HS-50) were stored at 50°C. for 14 days under loaded and unloaded conditions. The initial and final capacities were determined as described above. The following illustrates the results.

| Condition | Cell Capacity (11 battery average) |
|---|---|
| Reference batteries | 745 ma.-hr. |
| Batteries under no load after 14 days heat aging (50°C.) | 693 ma.-hr. |
| Batteries under 10,000 ohm load after 14 days heat aging (50°C.) | 759 ma.-hr. |
| Batteries under 27,000 ohm load after 14 days heat aging (50°C.) | 775 ma.-hr. |

These results suggest that the reference batteries were initially somewhat polarized. The external current drain under loaded conditions at 50°C. contributes to the depolarization of the battery, thereby increasing its capacity as compared to the reference batteries.

EXAMPLE 4

Two dry cell batteries type "D" (Ray-O-Vac 3D) loaded with a resistor having a steep negative temperature coefficient of resistance, and two similar batteries not loaded were thermally cycled over a 29-day period by placing them in a black metal can which was exposed to the sun. The internal temperature of the can varied from 50°C. to 15°C. The resistor element used was a commercial thermistor, Fenwal GA 51P2 having resistance values of 130,000 ohms at 23°C., 42,000 ohms at 50°C. and 20,000 ohms at 70°C. The following illustrates the results:

| Condition | Cell Capacity (two battery average) |
|---|---|
| Reference batteries | 1237 ma.-hr. |
| Batteries under no load thermally cycled | 885 ma.-hr. |
| Batteries thermally cycled with resistive load | 1105 ma.-hr. |

This invention has been described with reference to Leclanché-type dry cell batteries, but is also applicable to improve the shelf life of other batteries and particularly those with severe self-discharge characteristics. Typical of this type of battery are nonaqueous systems using lithium anodes and halide cathodes, and high temperature molten electrolyte batteries employing such couples as lithium or sodium anodes and halogen, sulfur or selenium cathodes. It is also suitable for use in battery systems which are subjected to dissolution of the cathode with subsequent transport and plating of the cathode element on the anode. External low current drains would inhibit this transport. Cathodes such as meta-dinitrobenzene in aqueous systems and $CuF_2$, $CuCl_2$ in aqueous and organic systems are typical examples of these dissoluting positives.

What I claim and desire to protect by Letters Patent is:

1. In a battery having self-discharge characteristics and an anode and a cathode within a container the improvement of which comprises a high resistance element connected across said anode and said cathode, wherein said high resistance element has a value selected to provide a predetermined low current drain on said battery.

2. A battery as set forth in claim 1 wherein said high resistance element is mounted externally of said container and is connected across said anode and said cathode.

3. A battery as set forth in claim 1 wherein said high resistance element is mounted internally within said container and is connected across said anode and said cathode.

4. A battery as set forth in claim 1 wherein said high resistance element has a high negative temperature coefficient of resistance.

5. In a dry cell battery having a zinc anode, a carbon cathode and a depolarizer-electrolyte mix within a container, the improvement of which comprises a high resistance element connected across said anode and said cathode, wherein said high resistance element has a value selected to provide a predetermined low current drain on said battery.

6. A dry cell battery as set forth in claim 5 wherein said high resistance element is mounted externally of said container and is connected across said anode and said cathode.

7. A dry cell battery as set forth in claim 5 wherein said high resistance element is mounted externally within said container and is connected across said anode and said cathode.

8. A dry cell battery as set forth in claim 5 wherein said high resistance element has a high negative temperature coefficient of resistance.

9. In a dry cell battery comprising a zinc anode in the form of a container, a depolarizer-electrolyte mix within said anode and a carbon cathode positioned and substantially within said electrolyte mix with one end projecting therefrom and the other end spaced from the bottom and sides of said anode, the improvement of which comprises a high resistance element connected across said anode and said cathode, wherein said high resistance element has a value selected to provide a predetermined current drain on said battery.

10. A dry cell battery as set forth in claim 9 wherein said high resistance element is mounted external to said anode and connects said anode to the projecting end of said cathode.

11. A dry cell battery as set forth in claim 9 wherein said high resistance element is mounted within said anode to internally connect said anode and said cathode.

12. A dry cell battery as set forth in claim 9 wherein said high resistance element has a high negative temperature coefficient of resistance.

13. A dry cell battery as set forth in claim 9 wherein said high resistance element has a value of about 10,000 ohms to about 40,000 ohms.

14. In an article operable by one or more batteries and having a compartment for receiving said batteries and an on-off switch for connecting said batteries into a circuit to operate the article, the improvement of which comprises a high resistance element mounted in said compartment to connect across the terminals of said batteries and provide a predetermined low current drain from said batteries to improve the shelf life thereof.

15. An article as set forth in claim 14 wherein said high resistance element is mounted so that it is connected across said terminals of said batteries when said switch is off, and is disconnected from said terminals when said switch is on.

16. An article as set forth in claim 14 wherein said high resistance element has a high negative temperature coefficient of resistance.

17. In a package for receiving one or more batteries, the improvement of which comprises a high resistance element mounted to said package to connect across the terminals of said batteries to provide a predetermined low current drain on said batteries.

18. A package as set forth in claim 17 wherein said high resistance element has a high negative temperature coefficient of resistance.

* * * * *